United States Patent
Gohari et al.

(10) Patent No.: US 9,451,652 B2
(45) Date of Patent: Sep. 20, 2016

(54) MANAGING SECONDARY CELL CONNECTIONS

(71) Applicant: QUALCOMM Incorporated, San Diego, CA (US)

(72) Inventors: Amir Aminzadeh Gohari, Poway, CA (US); Mariam Motamed, Redwood City, CA (US); Alexei Yurievitch Gorokhov, San Diego, CA (US); Thomas James Christol, Boulder, CO (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/202,930

(22) Filed: Mar. 10, 2014

(65) Prior Publication Data

US 2014/0274030 A1     Sep. 18, 2014

Related U.S. Application Data

(60) Provisional application No. 61/778,233, filed on Mar. 12, 2013.

(51) Int. Cl.
- *H04W 76/02* (2009.01)
- *H04W 52/02* (2009.01)
- *H04L 5/00* (2006.01)

(52) U.S. Cl.
CPC ......... *H04W 76/028* (2013.01); *H04W 52/028* (2013.01); *H04W 52/0238* (2013.01); *H04L 5/001* (2013.01); *H04L 5/0048* (2013.01); *Y02B 60/50* (2013.01)

(58) Field of Classification Search
CPC . H04L 5/001; H04L 5/0048; H04W 52/0238
USPC ......................................... 455/424
See application file for complete search history.

(56) References Cited

U.S. PATENT DOCUMENTS

| | | | |
|---|---|---|---|
| 2003/0181183 A1* | 9/2003 | Ventura .................. | 455/258 |
| 2010/0067507 A1* | 3/2010 | Park ....................... | 370/338 |
| 2010/0195507 A1* | 8/2010 | Marinier et al. ...... | 370/242 |

(Continued)

FOREIGN PATENT DOCUMENTS

WO   WO-2010088329 A1   8/2010

OTHER PUBLICATIONS

CATT: "Discussion on SCell Radio Link Monitoring", 3GPP Draft, R4-103876, 3rd Generation Partnership Project (3GPP), Mobile Competence Centre, 650, Route Des Lucioles, F-06921 Sophia-Antipolis Cedex, France, vol. RAN WG4, no. Xian, Oct. 11, 2010, Oct. 12, 2010, pp. - 54, XP050503529, [retrieved on 2919-19-12] paragraph [02.2].
International Search Report and Written Opinion—PCT/US2014/023278—ISA/EPO—Aug. 8, 2014.

*Primary Examiner* — Qun Shen
(74) *Attorney, Agent, or Firm* — Norton Rose Fulbright US LLP

(57) ABSTRACT

In wireless communication networks using carrier aggregation, a user equipment (UE) may monitor a downlink radio link quality of secondary cells for an event indicating failure of the communication link with the secondary cell. When a failure event is detected, the UE declares a failure state on the secondary cell. In response to the failure state, the UE may adjust operations related to the secondary component carrier in order to save power and resources.

25 Claims, 4 Drawing Sheets

(56) References Cited

U.S. PATENT DOCUMENTS

| | | | |
|---|---|---|---|
| 2012/0281548 A1* | 11/2012 | Lin et al. ................... 370/242 |
| 2013/0176862 A1 | 7/2013 | Gwak et al. |
| 2013/0183974 A1 | 7/2013 | Johansson et al. |
| 2013/0260766 A1 | 10/2013 | Lee et al. |
| 2013/0301434 A1 | 11/2013 | Krishnamurthy et al. |
| 2013/0310037 A1 | 11/2013 | Ji et al. |

* cited by examiner

MANAGING SECONDARY CELL CONNECTIONS

CROSS-REFERENCE TO RELATED APPLICATIONS

This application claims the benefit of U.S. Provisional Patent Application No. 61/778,233, entitled, "MANAGING SECONDARY CELL CONNECTIONS", filed on Mar. 12, 2013, which is expressly incorporated by reference herein in its entirety.

BACKGROUND

1. Field

Aspects of the present disclosure relate generally to wireless communication systems, and more particularly, to managing secondary cell connections.

2. Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance the UMTS technologies not only to meet the growing demand for mobile broadband access, but to advance and enhance the user experience with mobile communications.

SUMMARY

In one aspect of the disclosure, a method for wireless communication on a secondary component carrier in a wireless communication network using carrier aggregation. The method includes monitoring a downlink radio link quality of one or more configured secondary cells at a mobile device for an event indicating failure of a communication link with at least one of the configured secondary cells, and declaring a failure state on the at least one of the configured secondary cells in response to detecting the event, during which mobile device adjusts operation related to the secondary component carrier.

An additional aspect of the present disclosure is directed to an apparatus for wireless communication on a secondary component carrier in a wireless communication network using carrier aggregation that includes means for monitoring a downlink radio link quality of one or more configured secondary cells at a mobile device for an event indicating failure of a communication link with at least one of the configured secondary cells, and means for declaring a failure state on the at least one of the configured secondary cells in response to detecting the event, during which mobile device adjusts operation related to the secondary component carrier.

An additional aspect of the present disclosure is directed to a computer program product for wireless communications in a wireless network that includes a non-transitory computer-readable medium having program code recorded thereon. The program code includes code for causing a computer to monitor a downlink radio link quality of one or more secondary cells at a mobile device for an event indicating failure of a communication link with at least one of the configured secondary cells, and code for causing a computer to declare a failure state on the at least one of the configured secondary cells in response to detecting the event, during which mobile device adjusts operation related to the secondary component carrier.

An additional aspect of the present disclosure is directed to an apparatus configured for wireless communication. The apparatus includes at least one processor and a memory coupled to the processor. The processor is configured to monitor a downlink radio link quality of one or more secondary cells at a mobile device for an event indicating failure of a communication link with at least one of the configured secondary cells, and to declare a failure state on the at least one of the configured secondary cells in response to detecting the event, during which mobile device adjusts operation related to the secondary component carrier.

DETAILED DESCRIPTION

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

The techniques described herein may be used for various wireless communication networks such as CDMA, TDMA, FDMA, OFDMA, SC-FDMA and other networks. The terms "network" and "system" are often used interchangeably. A CDMA network may implement a radio technology, such as Universal Terrestrial Radio Access (UTRA), Telecommunications Industry Association's (TIA's) CDMA2000®, and the like. The UTRA technology includes Wideband CDMA (WCDMA) and other variants of CDMA. The CDMA2000® technology includes the IS-2000, IS-95 and IS-856 standards from the Electronics Industry Alliance (EIA) and TIA. A TDMA network may implement a radio technology, such as Global System for Mobile Communications (GSM). An OFDMA network may implement a radio technology, such as Evolved UTRA (E-UTRA), Ultra Mobile Broadband (UMB), IEEE 802.11 (Wi-Fi), IEEE 802.16 (WiMAX), IEEE 802.20, Flash-OFDMA, and the like. The UTRA and E-UTRA technologies are part of Universal Mobile Telecommunication System (UMTS). 3GPP Long Term Evolution (LTE) and LTE-Advanced (LTE-A) are newer releases of the UMTS that use E-UTRA. UTRA, E-UTRA, UMTS, LTE, LTE-A and GSM are described in documents from an organization called the "3rd Generation Partnership Project" (3GPP). CDMA2000® and UMB are described in documents from an organization called the "3rd Generation Partnership Project 2" (3GPP2). The techniques described herein may be used for the wireless networks and radio access technologies mentioned above, as well as other wireless networks and radio access technologies. For clarity, certain aspects of the techniques are described below for LTE or LTE-A (together referred to in the alternative as "LTE/-A") and use such LTE/-A terminology in much of the description below.

Figure 1:
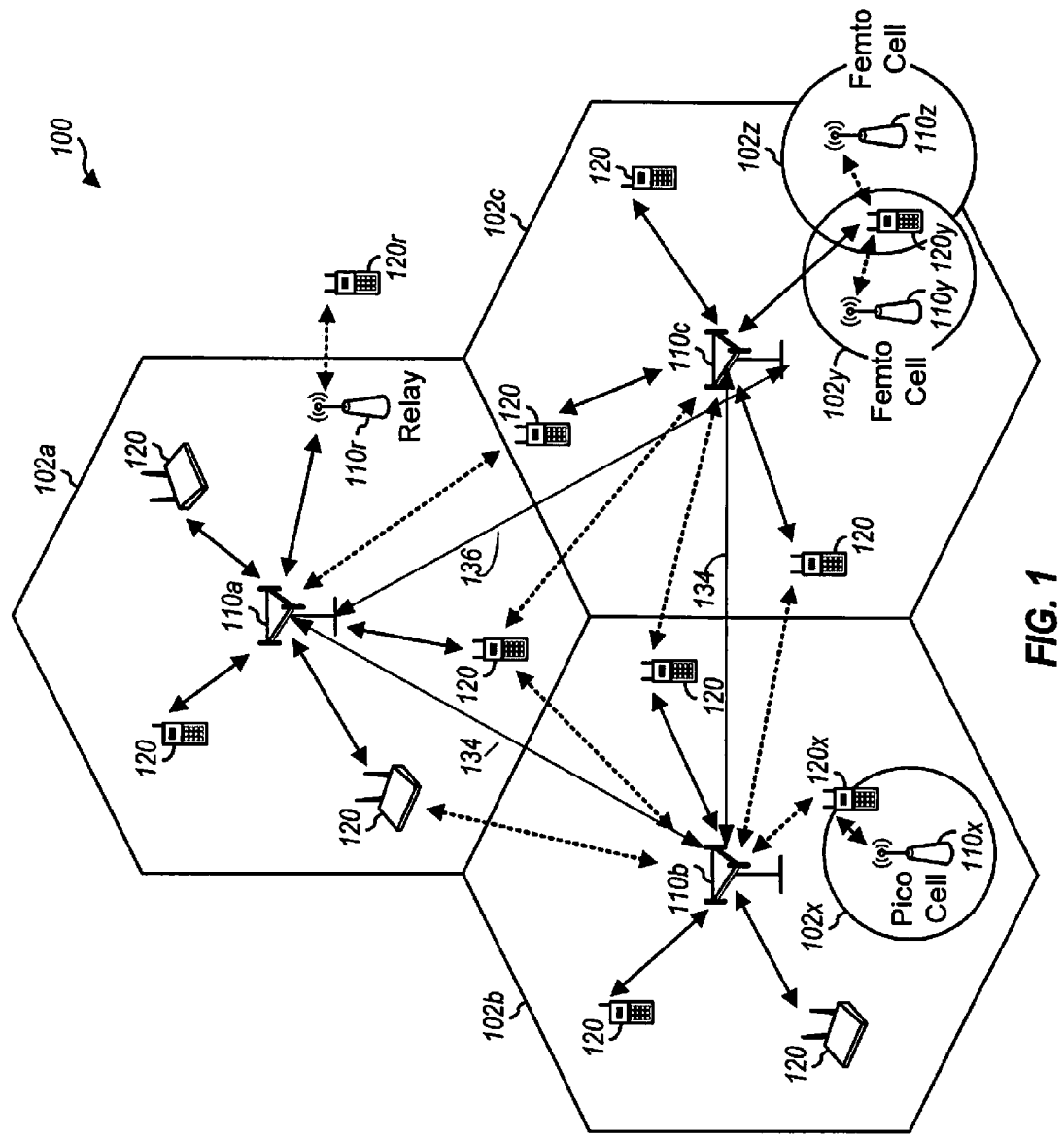
FIG. 1 is a block diagram conceptually illustrating an example of a mobile communication system.

FIG. 1 shows a wireless network 100 for communication, which may be an LTE-A network. The wireless network 100 includes a number of evolved node Bs (eNBs) 110 and other network entities. An eNB may be a station that communicates with the UEs and may also be referred to as a base station, a node B, an access point, and the like. Each eNB 110 may provide communication coverage for a particular geographic area. In 3GPP, the term "cell" can refer to this particular geographic coverage area of an eNB and/or an eNB subsystem serving the coverage area, depending on the context in which the term is used.

An eNB may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a pico cell may be referred to as a pico eNB. And, an eNB for a femto cell may be referred to as a femto eNB or a home eNB. In the example shown in FIG. 1, the eNBs 110a, 110b and 110c are macro eNBs for the macro cells 102a, 102b and 102c, respectively. The eNB 110x is a pico eNB for a pico cell 102x, serving a UE 120x. And, the eNBs 110y and 110z are femto eNBs for the femto cells 102y and 102z, respectively. An eNB may support one or multiple (e.g., two, three, four, and the like) cells.

The wireless network 100 may also include relay stations. A relay station is a station that receives a transmission of data and/or other information from an upstream station (e.g., an eNB, a UE, or the like) and sends a transmission of the data and/or other information to a downstream station (e.g., another UE, another eNB, or the like). A relay station may also be a UE that relays transmissions for other UEs. In the example shown in FIG. 1, a relay station 110r may communicate with the eNB 110a and a UE 120r, in which the relay station 110r acts as a relay between the two network elements (the eNB 110a and the UE 120r) in order to facilitate communication between them. A relay station may also be referred to as a relay eNB, a relay, and the like.

The wireless network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time.

The UEs 120 are dispersed throughout the wireless network 100, and each UE may be stationary or mobile. A UE may also be referred to as a terminal, a mobile station, a subscriber unit, a station, or the like. A UE may be a cellular phone, a smart phone, a personal digital assistant (PDA), a wireless modem, a wireless communication device, a handheld device, a tablet computer, a laptop computer, a cordless phone, a wireless local loop (WLL) station, or the like. A UE may be able to communicate with macro eNBs, pico eNBs, femto eNBs, relays, and the like. In FIG. 1, a solid line with double arrows indicates desired transmissions between a UE and a serving eNB, which is an eNB designated to serve the UE on the downlink and/or uplink. A dashed line with double arrows indicates interfering transmissions between a UE and an eNB.

LTE/-A utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, or the like. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 72, 180, 300, 600, 900, and 1200 for a corresponding system bandwidth of 1.4, 3, 5, 10, 15, or 20 megahertz (MHz), respectively. The system bandwidth may also be partitioned into sub-bands. For example, a sub-band may cover 1.08 MHz, and there may be 1, 2, 4, 8 or 16 sub-bands for a corresponding system bandwidth of 1.4, 3, 5, 10, 15, or 20 MHz, respectively.

In LTE/-A, an eNB may send a primary synchronization signal (PSS) and a secondary synchronization signal (SSS) for each cell in the eNB. The eNB may send the PSS, SSS and Physical Broadcast Channel (PBCH) in the center 1.08 MHz of the system bandwidth used by the eNB. The eNB may send the Physical Control Format Indicator Channel (PCFICH) and Physical Hybrid Automatic Repeat Request (HARQ) Indicator Channel (PHICH) across the entire system bandwidth in each symbol period in which these channels are sent. The eNB may send the Physical Downlink Control Channel (PDCCH) to groups of UEs in certain portions of the system bandwidth. The eNB may send the Physical Downlink Shared Channel (PDSCH) to specific UEs in specific portions of the system bandwidth. The eNB may send the PSS, SSS, PBCH, PCFICH and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 32 or 64 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

A UE may be within the coverage of multiple eNBs. One of these eNBs may be selected to serve the UE. The serving eNB may be selected based on various criteria such as received power, path loss, signal-to-noise ratio (SNR), etc.

The wireless network 100 uses the diverse set of eNBs 110 (i.e., macro eNBs, pico eNBs, femto eNBs, and relays) to improve the spectral efficiency of the system per unit area. Because the wireless network 100 uses such different eNBs for its spectral coverage, it may also be referred to as a heterogeneous network. The macro eNBs 110a-c are usually carefully planned and placed by the provider of the wireless network 100. The macro eNBs 110a-c generally transmit at high power levels (e.g., 5 W-40 W). The pico eNB 110x and the relay station 110r, which generally transmit at substantially lower power levels (e.g., 100 mW-2 W), may be deployed in a relatively unplanned manner to eliminate coverage holes in the coverage area provided by the macro eNBs 110a-c and improve capacity in the hot spots. The femto eNBs 110y-z, which are typically deployed independently from the wireless network 100 may, nonetheless, be incorporated into the coverage area of the wireless network 100 either as a potential access point to the wireless network 100, if authorized by their administrator(s), or at least as an active and aware eNB that may communicate with the other eNBs 110 of the wireless network 100 to perform resource coordination and coordination of interference management. The femto eNBs 110y-z typically also transmit at substantially lower power levels (e.g., 100 mW-2 W) than the macro eNBs 110a-c.

In operation of a heterogeneous network, such as the wireless network 100, each UE is usually served by the eNB 110 with the better signal quality, while the unwanted signals received from the other eNBs 110 are treated as interference. While such operational principals can lead to significantly sub-optimal performance, gains in network performance are realized in the wireless network 100 by using intelligent resource coordination among the eNBs 110, better server selection strategies, and more advanced techniques for efficient interference management.

In deployments of heterogeneous networks, such as the wireless network 100, a UE may operate in a dominant interference scenario in which the UE may observe high interference from one or more interfering eNBs. A dominant interference scenario may occur due to restricted association. For example, in FIG. 1, the UE 120y may be close to the femto eNB 110y and may have high received power for the eNB 110y. However, the UE 120y may not be able to access the femto eNB 110y due to restricted association and may then connect to the macro eNB 110c (as shown in FIG. 1) or to the femto eNB 110z also with lower received power (not shown in FIG. 1). The UE 120y may then observe high interference from the femto eNB 110y on the downlink and may also cause high interference to the eNB 110y on the uplink. Using coordinated interference management, the eNB 110c and the femto eNB 110y may communicate over the backhaul 134 to negotiate resources. In the negotiation, the femto eNB 110y agrees to cease transmission on one of its channel resources, such that the UE 120y will not experience as much interference from the femto eNB 110y as it communicates with the eNB 110c over that same channel.

Figure 2:
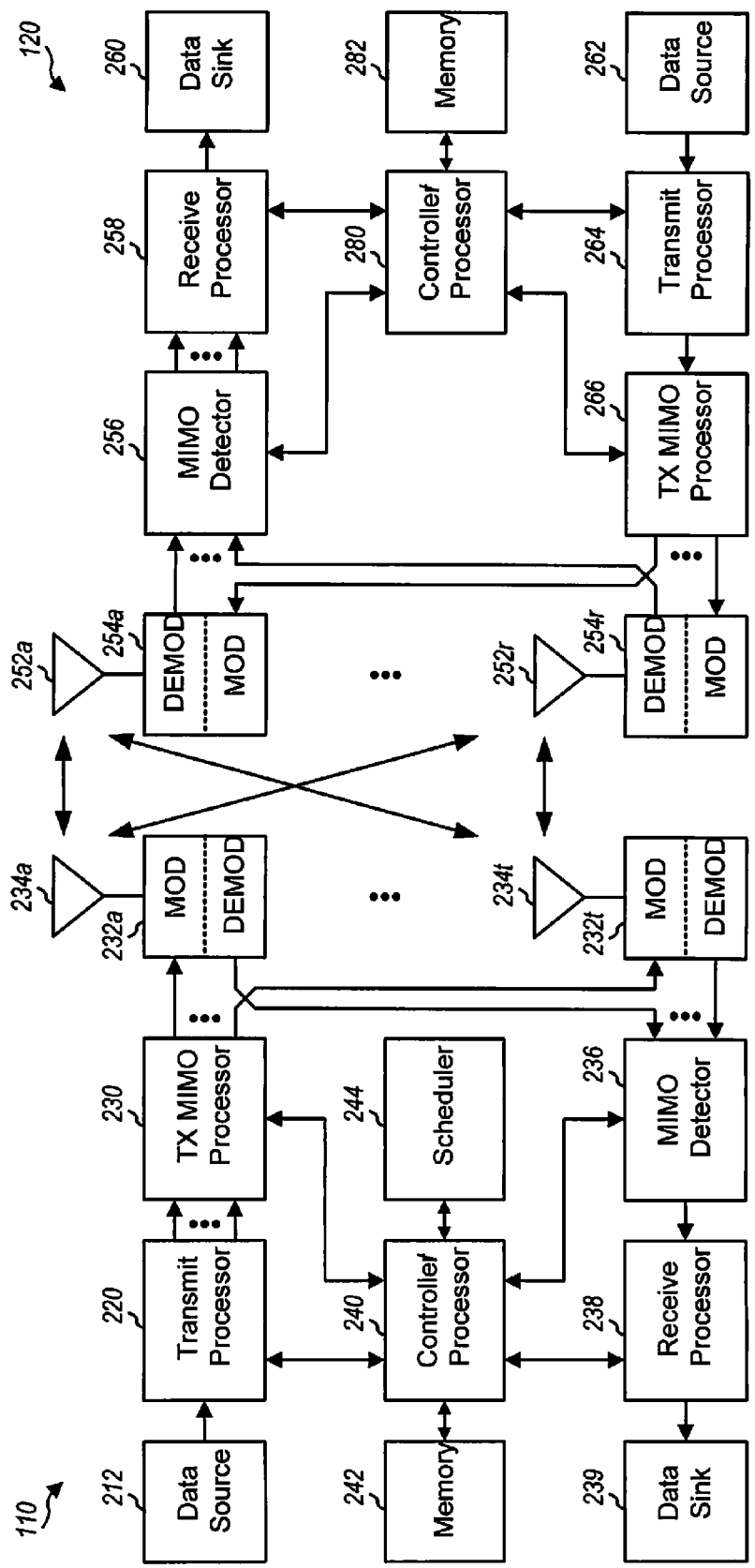
FIG. 2 is a block diagram conceptually illustrating a design of a base station/eNB and a UE configured according to one aspect of the present disclosure.

FIG. 2 shows a block diagram of a design of a base station/eNB 110 and a UE 120, which may be one of the base stations/eNBs and one of the UEs in FIG. 1. For a restricted association scenario, the eNB 110 may be the macro eNB 110c in FIG. 1, and the UE 120 may be the UE 120y. The eNB 110 may also be a base station of some other type. The eNB 110 may be equipped with antennas 234a through 234t, and the UE 120 may be equipped with antennas 252a through 252r.

At the eNB 110, a transmit processor 220 may receive data from a data source 212 and control information from a controller/processor 240. The control information may be for the PBCH, PCFICH, PHICH, PDCCH, etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the PSS, SSS, and cell-specific reference signal. A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. Downlink signals from modulators 232a through 232t may be transmitted via the antennas 234a through 234t, respectively.

At the UE 120, the antennas 252a through 252r may receive the downlink signals from the eNB 110 and may provide received signals to the demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all the demodulators 254a through 254r, perform MIMO detection on the received symbols if applicable, and provide detected symbols. A receive processor 258 may process (e.g., demodulate, deinterleave, and decode) the detected symbols, provide decoded data for the UE 120 to a data sink 260, and provide decoded control information to a controller/processor 280.

On the uplink, at the UE 120, a transmit processor 264 may receive and process data (e.g., for the PUSCH) from a data source 262 and control information (e.g., for the PUCCH) from the controller/processor 280. The transmit processor 264 may also generate reference symbols for a reference signal. The symbols from the transmit processor 264 may be precoded by a TX MIMO processor 266 if applicable, further processed by the modulators 254a through 254r (e.g., for SC-FDM, etc.), and transmitted to the eNB 110. At the eNB 110, the uplink signals from the UE 120 may be received by the antennas 234, processed by the demodulators 232, detected by a MIMO detector 236 if applicable, and further processed by a receive processor 238 to obtain decoded data and control information sent by the UE 120. The processor 238 may provide the decoded data to a data sink 239 and the decoded control information to the controller/processor 240.

The controllers/processors 240 and 280 may direct the operation at the eNB 110 and the UE 120, respectively. The controller/processor 240 and/or other processors and modules at the eNB 110 may perform or direct the execution of various processes for the techniques described herein. The controllers/processor 280 and/or other processors and modules at the UE 120 may also perform or direct the execution of the functional blocks illustrated in FIG. 4, and/or other processes for the techniques described herein. The memories 242 and 282 may store data and program codes for the eNB 110 and the UE 120, respectively. A scheduler 244 may schedule UEs for data transmission on the downlink and/or uplink.

LTE-A UEs use spectrum up to 20 MHz bandwidths allocated in a carrier aggregation of up to a total of 100 MHz (5 component carriers) used for transmission in each direction. Generally, less traffic is transmitted on the uplink than the downlink, so the uplink spectrum allocation may be smaller than the downlink allocation. For example, if 20 MHz is assigned to the uplink, the downlink may be assigned 100 MHz. These asymmetric FDD assignments will conserve spectrum and are a good fit for the typically asymmetric bandwidth utilization by broadband subscribers.

For the LTE-A mobile systems, two types of carrier aggregation (CA) methods have been proposed, continuous CA and non-continuous CA. Non-continuous CA occurs when multiple available component carriers are separated along the frequency band. On the other hand, continuous CA occurs when multiple available component carriers are adjacent to each other. Both non-continuous and continuous CA aggregate multiple LTE/component carriers to serve a single unit of LTE-A UE.

According to various aspects, a UE operating in CA may be configured to aggregate certain functions of multiple carriers, such as control and feedback functions, on the same carrier, which may be referred to as "primary component carriers." The network entities, eNBs, access points, and the like that communicate with a UE using the primary component carriers are referred to as "primary cells" or "PCells." The remaining carriers that depend on the primary carrier for support are referred to as "secondary component carriers." The network entities, eNBs, access points, and the like that communicate with a UE using the secondary component carriers are referred to as "secondary cells" or "SCells." For example, the UE may aggregate control functions such as those provided by the optional dedicated channel (DCH), the nonscheduled grants, a physical uplink control channel (PUCCH), and/or a physical downlink control channel (PDCCH). Signaling and payload may be transmitted both on the downlink by the eNB to the UE, and on the uplink by the UE to the eNB.

In cellular networks, in particular LTE networks, UEs are expected to monitor the quality of the radio link of the primary cell's received signal. The purpose of radio link monitoring (RLM) in the UE is to monitor the downlink radio link quality of the primary serving cell in a connected state and may be based on the cell specific reference signals (RSs). This, in turn, may enable the UE, when in a connected state, to determine whether the UE is in-sync or out-of-sync with respect to the UE's primary serving cell. In operation, counters may be used to count the consecutive in-sync and out-of-sync indicators, respectively. In case of a the consecutive primary cell out-of-sync counter exceeding a certain number or threshold value, the UE may start a network-configured radio link failure timer. The timer may be stopped prior to expiration if the consecutive in-sync counter records a certain number of consecutive in-sync indications reported by the UE's physical layer. Both the out-of-sync and in-sync counters are typically configured by the network. Upon expiry of the timer, without being stopped by the in-sync counter, Radio Link Failure (RLF) occurs at the UE and, consequently, the UE may start a re-establishment procedure to reestablish the radio communication link.

The UE's estimate of the downlink radio link quality may be compared with out-of-sync and in-sync thresholds for the purpose of RLM. The out-of-sync and in-sync thresholds may be expressed in terms of a Block Error Rate (BLER) of a hypothetical PDCCH transmission from the serving cell. The out-of-sync threshold may correspond to a 10% BLER while the in-sync threshold may correspond to a 2% BLER. The same threshold levels may be applicable with and without discontinuous reception (DRX). The mapping between the cell specific RS-based downlink quality and the hypothetical PDCCH BLER may be a UE implementation design choice.

In the case of carrier aggregation, RLM requirements may only apply to the primary cell and the UE may not perform RLM monitoring of the secondary cells. In other words, when the UE is configured with secondary cells, it may use the primary cell to detect the downlink radio link quality, and for sending out-of-sync/in-sync indications to higher layers. The eNB may determine radio link quality of the secondary cells via CQI or other such measurement reports.

A UE may operate a demodulation path that includes time/frequency tracking loops that can correct up to a certain amount of time or frequency shift due to multi-path or Doppler shift effect. These tracking loops generally have limited corrective capabilities and may be initialized at the start time of the connection with the associated secondary cell. Without proper initialization, (1) the tracking loops may not converge, or (2) the convergence time may be as high as tens of milliseconds to a few hundreds of milliseconds, which may be many times higher than the typical subframe duration (e.g., 1 ms for LTE).

In the context of carrier aggregation the following situations can occur when a UE is configured with one or more secondary cells: (1) A secondary cell may be activated for a UE when the UE is outside the secondary cell range (or coverage area) and then, moves into the secondary cell range sometime after the activation; (2) A UE temporarily moves out of a secondary cell range and then moves back into the range of the secondary cell when the primary cell/secondary cell timing difference is substantially different from the time where the UE left the secondary cell range (e.g., theoretically up to 62.6 considering the LTE specifications allow for up to 31.3 μs PCell/SCell timing difference), such as, for example, when remote-radio-heads (RRH) are used for secondary cell coverage extensions, etc.; and (3) A secondary cell's RF chain may be relinquished in order to be used to access another wireless technology (opportunistic CA) and is given back to the LTE stack after a long duration of time. For example, a secondary cell's RF chain and demodulation path may be used to tune to the frequency of a cell of another technology (e.g., Simultaneous Voice LTE (SV-LTE), Dual SIM, Dual-Active (DSDA) technologies, etc.). In operation, the UE may stop monitoring the secondary cell to answer another technology call, such as a circuit switched call on a 1× system, and then, sometime later, return to monitoring the secondary cell.

Without active management of the connections with the SCells, during the time that the UE is out of SCell coverage and/or is not able to track time/frequency of the SCell, the state of the tracking loops may become obsolete and may de-converge to random states. Therefore, it may become impossible for the tracking loops to re-converge or the convergence time may become too long once the UE returns to the SCell coverage area. This can be important with respect to time offset of the time tracking loop as the time offset variations between PCell and SCell may be up to 31.3 μs.

Various aspects of the present disclosure provide for monitoring of the link quality between the UE and SCells to detect a failure event, such as through loss of coverage, for example, when the receive power of a reference signal from the SCell falls below a threshold, or decreased demodulation performance, for example, when the BLER exceeds a threshold error rate. When such a failure event is detected, the UE will declare a failure state for the connection with the SCell associated with the failure event. In declaring the failure state, the UE is determining for itself the failed state. For purposes of the application, the UE declaring the failure state with the SCell does not include signaling any network entity outside of the UE that such failure has occurred. The declared failure state is internal to the UE. Based on this failure state, the UE may adjust operations, such as by suspending or deactivating certain components/modules and/or operations associated with the connection to the SCells, modifying the radio frequency (RF) chip state (e.g., disabling the RF chip or placing the RF chip in a lower power mode; disabling transmission while keeping reception enabled, etc.), suspending the transmit and receive paths for the SCell, reducing the power or voltage levels of the device components, changing memory usage or operating frequency of certain device components, and the like. When such failure state is declared, the UE may reduce resource consumption when certain resources associated with maintaining the connection to the associated SCell are not needed.

Also in response to declaring the failure state, the UE may begin a cell search for the SCell. The cell search may be a narrowband search that monitors for PSS/SSS of the SCell. When the SCell is detected, the UE may use the results of the search to recover or restore the connection or communication link with the SCell. The connection is recovered or restored when the UE is able to establish communication with the detected SCell to a quality level that decoding may occur of data received via the SCell. In some circumstances, the SCell recovered or restored may be the same SCell associated with the failure event. In other circumstances, the SCell recovered may, in fact, be a new SCell that was activated when the UE was out of range of that SCell's coverage area. The UE may use the results from the search to initialize or re-initialize the time/frequency tracking loops of the recovered SCell.

Figure 3:
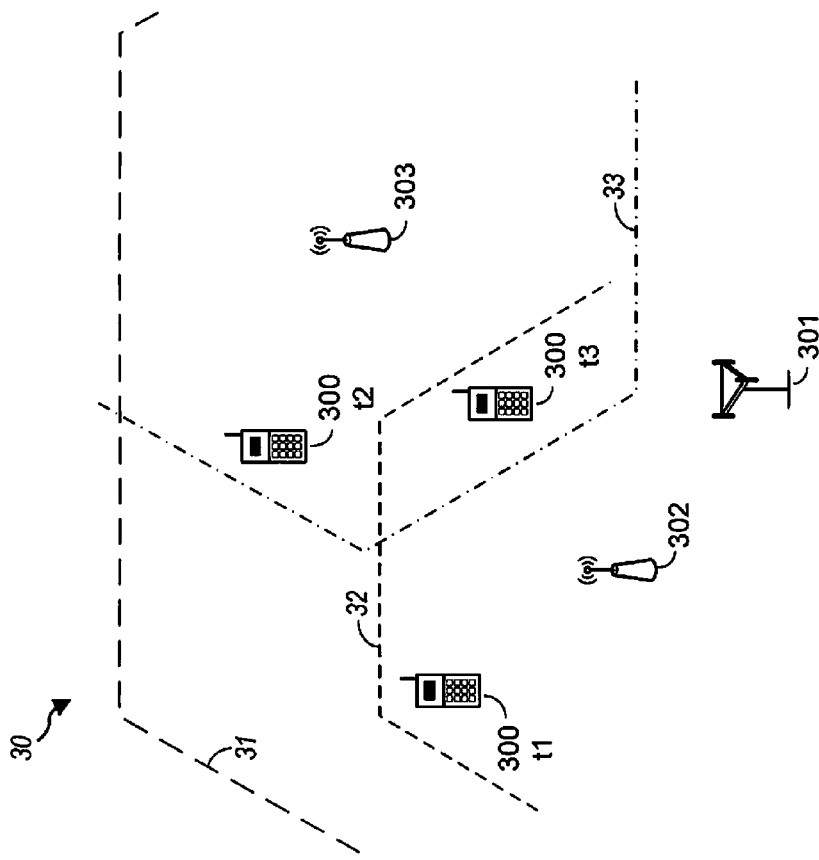
FIG. 3 is a block diagram illustrating a wireless network configured according to one aspect of the present disclosure.

FIG. 3 is a block diagram illustrating a wireless network 30 serving a UE 300 configured according to one aspect of the present disclosure. At time, t1, UE 300 is in communication with eNB 301, within coverage area 31, and remote radio head (RRH) 302, within coverage area 32. Wireless network 30 is configured to use carrier aggregation. UE 300 communicates using the primary component carrier through the PCell, eNB 301. Wireless network 30 assigns and activates RRH 302 to communicate over the secondary component carrier as an SCell to UE 300. At time, t1, UE 300 is communicating with the PCell eNB 301 and is also decoding communication on the secondary component carrier from SCell RRH 302. Also at time, t1, wireless network 30 assigns and activates access point 303 as an SCell for UE 300. UE 300 may or may not be informed of this assignment of access point 301. However, at time, t1, UE 300 is not within coverage area 33 of access point 303. Thus, as UE 300 fails to detect access point 303, it reports this failure to wireless network 30 through PCell eNB 301, such as through a low or 0 CQI or out-of-range CQI indication and/or a low value for a rank indicator.

At time, t2, UE 300 has traveled into coverage area 33 of SCell access point 303 and out of coverage area 32 of SCell RRH 302. UE 300 monitors the link quality of the connection or communication link with SCell RRH 302. When a failure event is detected, UE 300 declares for itself a failure state with SCell RRH 302. This failure event may be detected by monitoring the reference signal receive power (RSRP) of the SCell RRH 302, or, alternatively, by determining that the demodulation performance has fallen below a particular threshold. Demodulation performance may be measured through determination of the BLER associated with the SCell, such as SCell RRH 302. In response to the failure state, UE 300 may modify operations by suspending or deactivating certain components and/or operations associated with the connection to SCell RRH 302, such as reducing power to the receive and transmit paths, suspending the demodulation path with SCell RRH 302, and the like. UE 300 may also begin a cell search for SCell RRH 302 in response to the failure state being declared.

Regarding SCell access point 303, access point 303 may be activated by wireless network 30 as an SCell for UE 300 at time, t1. However, upon activation of SCell access point 303, UE 300 may not be within coverage area 33 of SCell access point 303. When UE 300 enters coverage area 33 of SCell access point 303, UE 300 may begin to detect the PSS/SSS of SCell access point 303. UE 300 may then initialize the time/frequency tracking loops and establish a connection with SCell access point 303 at time, t2. Once the connection is established, UE 300 unsuspends or activates the components and/or operations that were associated with the connection of SCell RRH 302 and begins reporting a CQI to wireless network 30 for SCell access point 303, after which wireless network 30 may begin transmitting data to UE 300 over the secondary component carrier through SCell access point 303, thus, providing additional bandwidth to UE 300.

It should be noted that SCell access point 303 may be detected during the cell search that begins when the failure state is declared on the failure of the connection with SCell RRH 302. In such case, UE 300 will compare the time/frequency offset data recovered from the cell search against the prior time/frequency offset data maintained by the previous time/frequency tracking loops associated with SCell RRH 302. During normal connection with a secondary cell, a UE will monitor the time/frequency offset data associated with the time/frequency tracking loops. The UE will maintain this time/frequency offset data when the connection is lost and this offset data will be compared against the search values of time/frequency offsets when the secondary cell is again detected. If the difference between the previous value of time/frequency offsets and the search values is small or, at least within the pull-in range of the time/frequency tracking loop, then the tracking loops may not be re-initialized. However, when offset values are out-of-sync by an amount outside of the pull-in range of the tracking loops, UE 300 will repopulate the time/frequency offset data to the tracking loops using the offset data resulting from the cell search.

At time, t3, UE 300 may move back into coverage area 32 of SCell RRH 302, while staying within coverage areas 32 and 31 of SCell access point 303 and PCell eNB 301, respectively. UE 300 may continue searching for available SCells. As UE 300 initially re-enters coverage area 32 of SCell RRH 302, the cell search will detect the PSS/SSS from SCell RRH 302 and, when the signal quality of the reference signals from SCell RRH 302 becomes strong enough to meet certain detectability criteria, e.g., the synchronization signal (PSS/SSS) has an SNR above a certain threshold or has a reference signal receive power (RSRP) above a certain other threshold, UE 300 may initialize the time/frequency tracking loops using the time/frequency offset information from the cell search for SCell RRH 302. UE 300 may also begin transmitting CQI information to wireless network 30 through PCell eNB 301. Wireless network 30 may then be able to increase the bandwidth available to UE 300 by sending data through the secondary component carrier used by SCell RRH 302 in addition to SCell access point 303.

Figure 4:
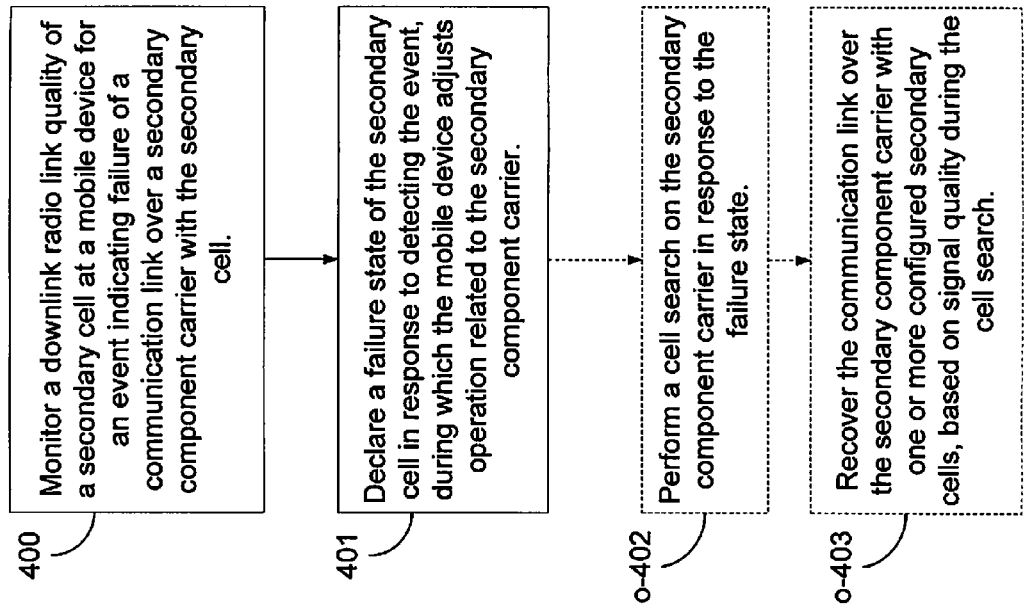
FIG. 4 is a functional block diagram illustrating example blocks executed to implement one aspect of the present disclosure.

FIG. 4 is a functional block diagram illustrating example blocks executed to implement one aspect of the present disclosure. At block 400, a UE monitors the downlink radio link quality of a secondary cell for an event that indicates failure of the communication link over a secondary component carrier with the secondary cell. The UE may perform the monitoring by various means, such as by monitoring the cell-specific RS of the secondary cell, monitoring the radio frame boundary returned from the UE's cell search of the secondary cell compared against the radio frame boundary returned from the demodulation path for the secondary cell, monitoring the BLER of demodulation from the secondary cell, and the like.

At block 401, when the UE detects a failure event in the connection or communication link with the secondary cell, the UE may adjust various operations related to communication using the secondary component carrier. For example, the UE may suspend or reduce the power or frequency of various components and resources associated with the secondary cell communication with the failed communication link, such as the RF chip state, the transmit and receive path states, the device voltage levels, memory usage, various components' operating frequencies, and the like. The UE may also suspend or deactivate the demodulation path associated with the failed secondary cell communication link. Thus, in response to the failure event detection, the UE may adjust communications operations to save power and resources.

In order to detect the failure event of block 401, the UE may detect an out-of-sync state similar to the current RLM procedures, expressed by the BLER of a hypothetical PDCCH transmission from the secondary cell. Alternatively, the UE may detect the failure event when the difference between the radio frame boundary returned from the cell search and the radio frame boundary returned from the demodulation path exceeds a particular threshold value, where the threshold value relates to the capabilities of the tracking loop, such as the size of the tracking loop pull-in range. The UE may also simply determine the RSRP of the secondary cell and when the RSRP falls below a predetermined threshold for a certain period of time, the UE will declare the failure state.

In addition to deactivating various communications operations on detection of a failure event, at block 401, the UE may optionally attempt to recover a secondary connection. For example, at optional block o-402, in response to the declared failure state, the UE may begin monitoring the periodic search results on secondary component carriers to check whether the secondary cell is found that meets certain detectability criteria, e.g., the synchronization signal (PSS/SSS) has an SNR above a certain threshold or has a RSRP above a certain other threshold for adequate communication. These cell searches may be configured as narrowband searches in order to detect the synchronization signals of the secondary cells, such as the PSS and SSS. The UE may also begin maintenance of the failure state with the wireless network by transmitting 0 CQI, signaling a rank indicator of 1 for the secondary cell, and, in case of cross-carrier scheduling, the UE will cease signaling acknowledgements (ACKs) or negative ACKs (NACKs) for the downlink schedules of the secondary cell.

At optional block o-403, when one or more suitable configured secondary cells is detected during the optional cell search performed at o-402, the results from the search, such as the time/frequency offsets, and the like, may be used to recover the communication link over the secondary component carrier with the one or more configured secondary cells. The configured secondary cells may include the secondary cell with which the previous communication link was lost, or it may be a different secondary cell enabled by the network that is detected and meets the appropriate threshold quality measurements for establishing communication. On detection, the UE will update any secondary cell tracking loops using the offset data resulting from the cell search. This information may be used to initialize or re-initialize the tracking loops for the one or more configured secondary cells. Also upon detection of the one or more configured secondary cells, the UE will activate any suspended or deactivated components or functionality that were suspended during the declared failure state, such as the demodulation path, transmit and receive paths, and the like.

Figure 5:
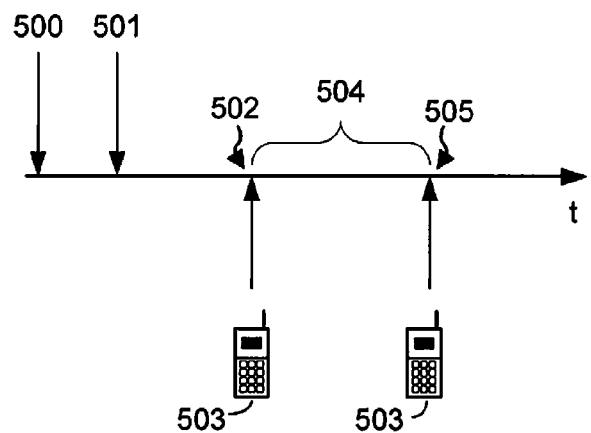
FIG. 5 is a timing diagram illustrating a UE configured according to one aspect of the present disclosure.

FIG. 5 is a timing diagram illustrating a UE 503 configured according to one aspect of the present disclosure. UE 503 operates in a wireless network that uses carrier aggregation. At time 500, the wireless network configures the carrier aggregation, establishing the primary and secondary component carriers for UE 503. At time 501, the wireless network assigns and activates each of the SCells that will provide the secondary component carriers for UE 503. After activation of the SCells, UE 503 establishes a good communication link with at least one of the SCells activated. Accordingly, after time 501, UE 503 begins reporting CQI for the connected SCell and receives and demodulates data from this SCell, while maintaining the primary component carrier connection with the serving PCell. At time 502, UE 503 detects a failure event with the communication link with at least one of the connected SCells.

In response to detecting the failure event, UE 503, at time 502, declares a failure state with regard to the SCell and modifies various operations associated with secondary component carrier communication with the failed SCell, including suspending or reducing power to the SCell transmit and receive paths, the demodulation path, changing the operating frequency of various components, and the like. In response to declaring the failure state, UE 503 also begins a narrowband search for the failed SCell link by monitoring the periodic search results on the secondary component carrier to check whether the SCell is found and meets certain detectability criteria, e.g., the synchronization signal (PSS/SSS) has an SNR above a certain threshold or has a RSRP above a certain other threshold.

During period 504, UE 503 operates in a reduced power/resource utilization state and performs the narrowband cell search for the failed SCell link. At time 505, UE 503 again detects the SCell through the cell search. In response to detecting the SCell again, the suspended components and/or operations may be reactivated for managing the connection with the SCell. UE 503, thus, begins reporting CQI for the SCell and receiving and decoding data from the SCell.

Figure 6:
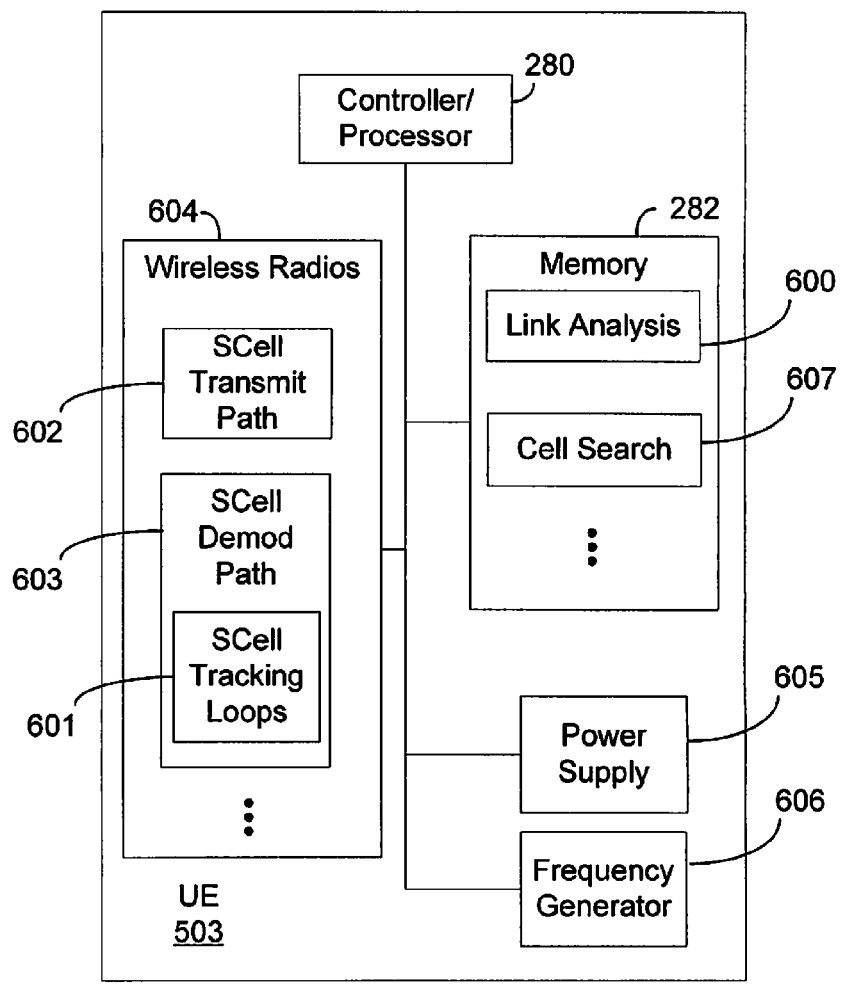
FIG. 6 is a block diagram illustrating a UE configured according to one aspect of the present disclosure.

FIG. 6 is a block diagram illustrating UE 503 configured according to one aspect of the present disclosure. UE 503 includes a controller/processor 280. Controller/processor 280 controls the components and executes logic stored in memory 282 that provides the features of functionalities of UE 503. In order to monitor the communication link with the connected SCell, UE 503, under control of controller/processor 280, controls the signals received through the SCell demodulation path 603 of wireless radios 604, from the connected SCell. The combination of these components and acts may provide means for monitoring a downlink radio link quality of one or more secondary cells at a mobile device for an event indicating failure of a communication link with at least one of the one or more secondary cells.

Controller/processor 280 accesses memory 282 to executed link analysis logic 600. The executing environment of link analysis logic 600, analyzes the connection with the SCell and determines whether a link failure has occurred. For example, the executing link analysis logic 600 may cause controller/processor 280 to detect an out-of-sync state in the cell-specific RS received over SCell demodulation path 603, as expressed by an estimated BLER of a hypothetical PDCCH transmission from the SCell, of wireless radios 604.

Alternatively, the executing link analysis logic 600 may cause controller/processor 280 to detect the failure event when the difference between the radio frame boundary returned from the cell search and the radio frame boundary returned from the demodulation path exceeds a particular threshold value. UE 503 receives the search results after executing cell search logic 607, under control of controller/processor 280, and receiving and sending search signals through SCell transmit path 602 and SCell demodulation path 603, respectively, in wireless radios 604. The radio frame boundary returned from execution of cell search logic 607 by controller/processor 280 may be compared against the radio frame boundary returned from operation of SCell demodulation path 603 in wireless radio(s) 604 in order to determine the failure state.

The executing link analysis logic 600 may cause controller/processor 280 to simply determine the RSRP of the SCell signal received at wireless radios 604 through SCell demodulation path 603 and when the RSRP falls below a predetermined threshold for a certain period of time, the UE will declare the failure state.

Based on the results of the executing link analysis logic 600, controller/processor 280 detects a failure of the communication link with the SCell and declares a failure state. In response, to the declared failure state, UE 503, under control of controller/processor 280, suspends or deactivates SCell transmit path 602 and SCell demodulation path 603 in wireless radios 604. Controller/processor 280 may also reduce the power output of power supply 605 in order to reduce the voltage level to wireless radios 604, and the like. Moreover, controller/processor 280 may change the frequency of various components by changing the operations of frequency generator 606. The combination of these components and acts may provide means for declaring a failure state on the at least one of the one or more secondary cells in response to detecting the event, during which mobile device adjusts operation related to the secondary component carrier Also, in response to the declared failure state, controller/processor 280 executes cell search logic 607 in memory 282 to perform a cell search for the failed SCell link by monitoring the periodic search results on the secondary component carrier to check whether the SCell is found and meets certain detectability criteria, e.g., the synchronization signal (PSS/SSS) has an SNR above a certain threshold or has a RSRP above a certain other threshold. The executing cell search logic 607 sends search messages and listens for synchronization signals over wireless radios 604. The combination of these components and acts may provide means for performing cell search for the at least one of the one or more secondary cells in response to the failure state.

During the declared failure state, UE 503 may also begin transmitting a low, e.g., a 0, CQI and signaling a low, e.g., a 1, rank indicator for the SCell to the network. In case of cross-carrier scheduling, UE 503 will also cease signaling acknowledgements (ACKs) or negative ACKs (NACKs) for the downlink schedules of the SCell.

When the SCell is detected by UE 503, through execution of cell search logic 607 by controller/processor 280, controller/processor 280 reactivates each of the components and processes that were suspended during the failure state. Controller/processor 280 reactivates SCell transmit path 602 and SCell demodulation path 603, and returns the power and frequency settings back to the original levels through access to power supply 605 and frequency generator 606. Controller/processor 280 compares the time/frequency offsets that resulted from execution of cell search logic 607 to the operation of SCell tracking loops 601 operated from SCell demodulation path 603 by controller/processor 280. If the time/frequency offsets determined in the cell search do not match the time/frequency offsets of the operating SCell tracking loops 601, and the difference is greater than the pull-in range of the operating SCell tracking loops 601, then controller/processor 280 initializes or re-initializes SCell tracking loops 601 using the time/frequency offsets from execution of cell search logic 607. UE 503, under control of controller/processor 280 is then able to recover or reestablish the connection with the detected SCell. UE 503 will begin transmitting CQI for the recovered SCell to the network and begin to receive data transmitted over the SCell to increase the throughput from the network. The combination of these components and acts may provide means for recovering the communication link with a secondary cell detected during the cell search.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIG. 4 may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. A computer-readable storage medium may be any available media that can be accessed by a general purpose or special purpose computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, non-transitory connections may properly be included within the definition of computer-readable medium. For example, if the instructions are transmitted from a website, server, or other remote source using a coaxial cable, fiber optic cable, twisted pair, or digital subscriber line (DSL), then the coaxial cable, fiber optic cable, twisted pair, or DSL are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communication on a secondary component carrier of a mobile device in a wireless communication network using carrier aggregation, comprising:
    monitoring a downlink radio link quality of a secondary cell at the mobile device for an event indicating failure of a communication link over the secondary component carrier with the secondary cell;
    declaring a failure state of the secondary cell in response to detecting the event,
    wherein the detecting comprises measuring at least one of a channel quality of a reference signal received from the secondary cell or a demodulation performance at the mobile device, wherein the event includes a link failure detected when at least one of the channel quality or demodulation performance falls below a predetermined threshold for a predetermined time period during which the mobile device adjusts operation related to the secondary component carrier, wherein the failure state is declared by the mobile device for its own use at the mobile device;

performing a cell search on the secondary component carrier in response to the failure state, wherein the cell search comprises monitoring one or more synchronization or reference signals from one or more secondary cells assigned for communication over the secondary component carrier; and recovering the communication link over the secondary component carrier using the one or more secondary cells, based on a quality of the monitored one or more synchronization or reference signals, wherein the recovering the communication link comprises establishing a connection with the one or more secondary cells such that the communication link over the secondary component carrier includes communication with the one or more secondary cells, wherein recovering the communication link over the secondary component carrier using the one or more secondary cells is performed without modifying a communication link of the mobile device over a primary component carrier with a primary cell, and wherein the one or more secondary cells does not include the primary cell.

2. The method of claim 1, further comprising, in response to declaring the failure state:

disabling, at the mobile device, a RF receiver associated with the secondary cell;

disabling, at the mobile device, a demodulation path associated with the secondary cell;

disabling, at the mobile device, a modulation path associated with the secondary cell;

reducing power at the mobile device; or a combination of two or more thereof.

3. The method of claim 2, wherein the reducing power at the mobile device includes one of:

lowering a voltage level of some components in the mobile device;

disabling the voltage level of some components in the mobile device;

lowering a frequency level of some components in the mobile device;

disabling the frequency level of some components in the mobile device; or a combination of two or more thereof.

4. The method of claim 1, further comprising:

performing a measurement, in response to the failure state, of the quality of one or more of: the one or more synchronization or reference signals, or cell specific reference signals, of the one or more secondary cells, wherein the recovering includes recovering the communication link over the secondary component carrier with the one or more secondary cells when the quality meets at least a threshold quality for communication.

5. The method of claim 1, wherein the recovering the communication link with the one or more secondary cells includes one of:

enabling, at the mobile device an RF receiver associated with the one or more secondary cells;

activating, at the mobile device, a demodulation path associated with the one or more secondary cells;

activating, at the mobile device, a modulation path associated with the one or more secondary cells;

restoring power at the mobile device; or a combination of two or more thereof.

6. The method of claim 1, wherein the recovering the communication link with the one or more secondary cells comprises updating, by the mobile device, one or more secondary cell tracking loops using a search offset detected during the cell search; and wherein the updating the one or more secondary cell tracking loops includes re-initializing the one or more secondary cell tracking loops.

7. The method of claim 1, further comprising signaling one or more of:

a channel quality indicator set to a low quality value for the secondary cell;

a rank indicator set to a low rank value for the secondary cell;

a measurement report set to a low measurement value for the secondary cell; and no acknowledgements (ACKs) or negative acknowledgements (NACKs), for cross-carrier scheduling, for a downlink schedule of the secondary cell.

8. The method of claim 1, wherein the operation related to the secondary component carrier includes one or more of:

adjustment of resources of the mobile device allocated to communication on the secondary cell;

receipt of data at the mobile device on the secondary cell; and transmission of data from the mobile device on the secondary cell.

9. An apparatus for wireless communication on a secondary component carrier in a wireless communication network using carrier aggregation, comprising:

means for monitoring a downlink radio link quality of a secondary cell at a mobile device for an event indicating failure of a communication link over the secondary component carrier with the secondary cell;

means for declaring a failure state of the secondary cell in response to detecting the event, wherein the detecting comprises means for measuring at least one of a channel quality of a reference signal received from the secondary cell or a demodulation performance at the mobile device, wherein the event includes a link failure detected when at least one of the channel quality or demodulation performance falls below a predetermined threshold for a predetermined time period during which the mobile device adjusts operation related to the secondary component carrier, wherein the failure state is declared by the mobile device for its own use at the mobile device;

means, executable in response to the failure state, for performing a cell search on the secondary component carrier, wherein the means for performing the cell search comprises means for monitoring one or more synchronization or reference signals from one or more secondary cells assigned for communication over the secondary component carrier; and means for recovering the communication link over the secondary component carrier using the one or more secondary cells, based on a quality of the monitored one or more synchronization or reference signals, wherein the means for recovering the communication link comprises means for establishing a connection with the one or more secondary cells such that the communication link over the secondary component carrier includes communication with the one or more secondary cells, wherein the means for recovering the communication link over the secondary component carrier using the one or more secondary cells include means for the recovering without modifying a communication link of the mobile device over a primary component carrier with a primary cell, and wherein the one or more secondary cells does not include the primary cell.

10. The apparatus of claim 9,
wherein the means for recovering the communication link with the one or more secondary cells comprises means for updating, by the mobile device, one or more secondary cell tracking loops using a search offset detected during the cell search; and
wherein the means for updating the one or more secondary cell tracking loops includes re-initializing the one or more secondary cell tracking loops.

11. The apparatus of claim 9, further comprising:
means, executable in response to the failure state, for signaling one or more of:
a channel quality indicator set to a low quality value for the secondary cell;
a rank indicator set to a low rank value for the secondary cell;
a measurement report set to a low measurement value for the secondary cell; and
no acknowledgements (ACKs) or negative acknowledgements (NACKs), for cross-carrier scheduling, for a downlink schedule of the secondary cell.

12. A non-transitory computer-readable medium having program code recorded thereon, the program code comprising:
program code for causing a computer to monitor a downlink radio link quality of a secondary cell at a mobile device for an event indicating failure of a communication link over the secondary component carrier with the secondary cell;
program code for causing the computer to declare a failure state of the secondary cell in response to detecting the event, wherein the detecting comprises program code for causing the computer to measure at least one of a channel quality of a reference signal received from the secondary cell or a demodulation performance at the mobile device, wherein the event includes a link failure detected when at least one of the channel quality or demodulation performance falls below a predetermined threshold for a predetermined time period during which the mobile device adjusts operation related to the secondary component carrier, wherein the failure state is declared by the mobile device for its own use at the mobile device;
program code, executable in response to the failure state, for causing the computer to perform a cell search on the secondary component carrier, wherein the program code for causing the computer to perform the cell search comprises program code for causing the computer to monitor one or more synchronization or reference signals from one or more secondary cells assigned for communication over the secondary component carrier; and
program code for causing the computer to recover the communication link over the secondary component carrier using the one or more secondary cells, based on a quality of the monitored one or more synchronization or reference signals, wherein the program code for causing the computer to recover the communication link comprises program code for causing the computer to establish a connection with the one or more secondary cells such that the communication link over the secondary component carrier includes communication with the one or more secondary cells, wherein the program code for causing the computer to recover the communication link over the secondary component carrier using the one or more secondary cells includes program code for causing the computer to perform the recovering without modifying a communication link of the mobile device over a primary component carrier with a primary cell, and wherein the one or more secondary cells does not include the primary cell.

13. The non-transitory computer-readable medium of claim 12, further comprising, executed in response to declaring the failure state:
program code for causing the computer to disable, at the mobile device, a RF receiver associated with the secondary cell;
program code for causing the computer to disable, at the mobile device, a demodulation path associated with the secondary cell;
program code for causing the computer to disable, at the mobile device, a modulation path associated with the secondary cell;
program code for causing the computer to reduce power at the mobile device; or
a combination of two or more thereof.

14. The non-transitory computer-readable medium of claim 13, wherein the program code for causing the computer to reduce power at the mobile device includes one of:
program code for causing the computer to lower a voltage level of some components in the mobile device;
program code for causing the computer to disable the voltage level of some components in the mobile device;
program code for causing the computer to lower a frequency level of some components in the mobile device;
program code for causing the computer to disable the frequency level of some components in the mobile device; or
a combination of two or more thereof.

15. The non-transitory computer-readable medium of claim 14, further comprising:
program code, executable in response to the failure state, for causing the computer to perform a measurement of the quality of one or more of: the one or more synchronization or reference signals, or cell specific reference signals, of the one or more secondary cells, wherein the program code for causing the computer to recover includes program code for causing the computer to recover the communication link over the secondary component carrier with the one or more secondary cells when the quality meets at least a threshold quality for communication.

16. The non-transitory computer-readable medium of claim 14, wherein the program code for causing the computer to recover the communication link with the one or more secondary cells includes one of:
program code for causing the computer to enable, at the mobile device, an RF receiver associated with the one or more secondary cells;
program code for causing the computer to activate, at the mobile device, a demodulation path, associated with the one or more secondary cells;
program code for causing the computer to activate, at the mobile device, a modulation path associated with the one or more secondary cells;

program code for causing the computer to restore power at the mobile device; or
a combination of two or more thereof.

17. The non-transitory computer-readable medium of claim 14, wherein the program code for causing the computer to recover the communication link with the one or more secondary cells comprises program code for causing the computer to update, by the mobile device, one or more secondary cell tracking loops using a search offset detected during the cell search; and
wherein the program code for causing the computer to update the one or more secondary cell tracking loops includes program code for causing the computer to re-initialize the one or more secondary cell tracking loops.

18. The non-transitory computer-readable medium of claim 12, wherein the operation related to the secondary component carrier includes one or more of:
adjustment of resources of the mobile device allocated to communication on the secondary cell;
receipt of data at the mobile device on the secondary cell; and
transmission of data from the mobile device on the secondary cell.

19. An apparatus configured for wireless communication, the apparatus comprising:
at least one processor; and
a memory coupled to the at least one processor,
wherein the at least one processor is configured:
to monitor a downlink radio link quality of a secondary cell at a mobile device for an event indicating failure of a communication link over the secondary component carrier with the secondary cell;
to declare a failure state of the secondary cell in response to detecting the event,
wherein the detecting comprises measuring at least one of a channel quality of a reference signal received from the secondary cell or a demodulation performance at the mobile device, wherein the event includes a link failure detected when at least one of the channel quality or demodulation performance falls below a predetermined threshold for a predetermined time period during which the mobile device adjusts operation related to the secondary component carrier, wherein the failure state is declared by the mobile device for its own use at the mobile device;
to perform a cell search on the secondary component carrier in response to the failure state, wherein the cell search comprises monitoring one or more synchronization or reference signals from one or more secondary cells assigned for communication over the secondary component carrier; and
to recover the communication link over the secondary component carrier using the one or more secondary cells, based on a quality of the monitored one or more synchronization or reference signals, wherein the configuration of the at least one processor to recover the communication link comprises configuring the at least one processor establish a connection with the one or more secondary cells such that the communication link over the secondary component carrier includes communication with the one or more secondary cells, wherein the configuration of the at least one processor to recover the communication link over the secondary component carrier using the one or more secondary cells is performed without modifying a communication link of the mobile device over a primary component carrier with a primary cell, and wherein the one or more secondary cells does not include the primary cell.

20. The apparatus of claim 19, further comprising, in response to declaring the failure state, configuration of the at least one processor:
to disable, at the mobile device, a RF receiver associated with the secondary cell;
to disable, at the mobile device, a demodulation path associated with the secondary cell;
to disable, at the mobile device, a modulation path associated with the secondary cell;
to reduce power at the mobile device; or
a combination of two or more thereof.

21. The apparatus of claim 20, wherein the configuration of the at least one processor to reduce power at the mobile device includes one of: configuration of the at least one processor:
to lower a voltage level of some components in the mobile device;
to disable the voltage level of some components in the mobile device;
to lower a frequency level of some components in the mobile device;
to disable the frequency level of some components in the mobile device; or
a combination of two or more thereof.

22. The apparatus of claim 19, further comprising configuration of the at least one processor to perform, in response to the failure state, a measurement of the quality of one or more of: the one or more synchronization or reference signals, or cell specific reference signals, of the one or more secondary cells,
wherein the configuration of the at least one processor to recover includes configuration to recover the communication link over the secondary component carrier with the one or more secondary cells when the quality meets at least a threshold quality for communication.

23. The apparatus of claim 19, wherein the configuration of the at least one processor to recover the communication link over the secondary component carrier with the one or more secondary cells includes configuration of the at least one processor to one of:
enable, at the mobile device, a RF receiver associated with the one or more secondary cells;
activate, at the mobile device, a demodulation path associated with the one or more secondary cells;
activate, at the mobile device, a modulation path associated with the one or more secondary cells;
restore power at the mobile device; or
a combination of two or more thereof.

24. The apparatus of claim 19,
wherein the configuration of the at least one processor to recover the communication link with the one or more secondary cells comprises configuration to update, by the mobile device, one or more secondary cell tracking loops using a search offset detected during the cell search; and
wherein the configuration of the at least one processor to update the one or more secondary cell tracking loops includes configuration to re-initialize the one or more secondary cell tracking loops.

25. The apparatus of claim 19, wherein the operation related to the secondary component carrier includes one or more of:

adjustment of resources of the mobile device allocated to communication on the secondary cell;
receipt of data at the mobile device on the secondary cell; and
transmission of data from the mobile device on the secondary cell.

\* \* \* \* \*